UNITED STATES PATENT OFFICE.

SAMUEL T. STRATTON, OF PHILADELPHIA, PENNSYLVANIA.

IMPROVEMENT IN MANUFACTURE OF STARCH.

Specification forming part of Letters Patent No. 22,460, dated December 28, 1858.

*To all whom it may concern:*

Be it known that I, SAML. T. STRATTON, of Philadelphia, county of Philadelphia, in the State of Pennsylvania, have invented a new and useful Process for the Manufacture of Starch; and I do hereby declare that the following is a full and exact description thereof.

My invention has for its object the obtaining from a given quantity of grain of a greater quantity of starch, of a better quality, in a shorter time, and at a less expense, than by any of the known processes of manufacture; and it consists in steeping the corn or other material (whole or crushed) in an alkaline or caustic-alkaline liquor at the strength of one or more degrees alkaline hydrometer, and at a temperature of from 70° to 130° Fahrenheit's thermometer, as hereinafter more fully described.

I will now proceed to describe the manner of applying my improved process in the manufacture of starch.

I take maize or Indian corn or wheat, in the whole or crushed state, and steep it in alkaline or caustic-alkaline liquor of the strength of one or more degrees alkaline hydrometer, at a temperature of 120° of Fahrenheit's thermometer, or at any temperature between 70° and 130° of Fahrenheit's thermometer. The whole or crushed corn or wheat is thus steeped for about a week, more or less. This caustic-alkaline liquor may be changed several times. The high temperature is maintained during the steeping. The grains of corn or wheat are thus swollen by the combined action of the caustic-alkaline liquor and the heat, and the extraneous matter of the corn or wheat is thus so decomposed and dissolved or acted upon by the steeped liquor as to admit of the particles of the starch and husks being easily separated. The swollen corn or wheat is then ground on millstones, or by other means, with a current of water. The watery pulp or mixture thus produced is diluted, if necessary, with more water, and it is passed through a sieve or sieves or strainers, such as are commonly used by starch-manufacturers, by which means the husks and fibrous or extraneous matter are arrested, while the starch and water pass through the sieves. The starch is separated from the water by allowing it to subside. The water is drawn off and fresh water added, and the starch well stirred up. It is then passed over what is sometimes called a "run" or "table" or "gutters," which consist of an inclined plane or trough which may be about eighteen inches wide and fifty feet long and five inches deep, and having an elevation or fall of about two inches. These dimensions may, however, be varied. The starch-water is allowed to flow gently in a thin sheet down this inclined plane. The starch settles upon this plane while the water and the gluten and fibrous matter pass away at the lower end, when a considerable quantity of starch is then removed by a shovel and thrown into a cistern, where it is stirred up with water and allowed to subside. It is then placed in boxes, drained, dried, and packed in papers, and stored in the usual manner.

Having now described the nature of my invention and the manner of rendering my process practical, I disclaim the use of cold alkalies or alkaline liquors for steeping the material; but

What I claim as new in the manufacture, and desire to secure by Letters Patent, is—

Steeping the material from which the starch is extracted (either whole or crushed) in an alkaline or caustic-alkaline liquor of a suitable strength, and artificially heated to a temperature of from 70° to 130° Fahrenheit's thermometer, as hereinbefore specified.

In testimony whereof I have hereunto set my hand and seal this 1st day of October, 1858.

SAMUEL T. STRATTON. [L. S.]

Witnesses:
PETER W. STEELE,
G. W. LONG.